United States Patent
Link et al.

(10) Patent No.: US 6,386,143 B1
(45) Date of Patent: May 14, 2002

(54) STEPPING PAD FOR CAT LITTER BOX

(76) Inventors: James D. Link, 9764 Sandy Pointe, Fair Haven, MI (US) 48023; John R. Link, 35165 Beattie Dr., Sterling Heights, MI (US) 48312

(*) Notice: Subject to any disclaimer, the term of this patent is extended or adjusted under 35 U.S.C. 154(b) by 0 days.

(21) Appl. No.: 09/307,757

(22) Filed: Mar. 5, 1999

Related U.S. Application Data

(60) Provisional application No. 60/077,139, filed on Mar. 6, 1998.

(51) Int. Cl.$^7$ ............................................... A01K 29/00
(52) U.S. Cl. ................................................... 119/165
(58) Field of Search .............................. 119/28.5, 161, 119/165, 166, 167, 168, 652, 621, 622; 5/417, 420, 901, 925; 15/217, 218, 215, 238

(56) References Cited

U.S. PATENT DOCUMENTS

| | | | | |
|---|---|---|---|---|
| 5,193,488 A | * | 3/1993 | Walton | 119/166 |
| 5,289,800 A | * | 3/1994 | Walton | 119/166 |
| 5,329,879 A | * | 7/1994 | Walton | 119/166 |
| 5,797,352 A | * | 8/1998 | Ebert | 119/652 |
| 6,050,223 A | * | 4/2000 | Harris | 119/165 |

* cited by examiner

Primary Examiner—Thomas Price
(74) Attorney, Agent, or Firm—Harness, Dickey & Pierce, P.L.C.

(57) ABSTRACT

A method and apparatus is described for collecting and recycling litter material lodged in the paw of an animal. The apparatus includes a base having a substantially C-shaped wall extending along the peripheral edge of the base, as well as an open portion having no wall associated therewith. On the top surface of the base is disposed a plurality of elongated raised members. These elongated raised members extend along a portion of the top surface of the base in a substantially perpendicular direction to the open portion of the base. A litter box is then placed in close proximity to the open portion of the base. When the animal exits the litter box and steps onto the apparatus, the litter materials lodged in its paw are dislodged when the paw contacts the plurality of elongated raised members. The apparatus can then be conveniently tilted to collect the dislodged litter material. The collected litter material can then be recycled back into the litter box.

10 Claims, 3 Drawing Sheets

STEPPING PAD FOR CAT LITTER BOX

This application claims benefit of Provisional Application No. 60/077,139 filed Mar. 6, 1998.

FIELD OF THE INVENTION

The present invention relates generally to litter boxes, and particularly to a method and apparatus for collecting and recycling litter material lodged in the paws of cats.

BACKGROUND OF THE INVENTION

Certain animals, such as cats, ferrets, rabbits, guinea pigs, hamsters, reptiles and birds, are capable of being trained to routinely defecate and urinate in specialized receptacles, generally referred to as litter boxes. With respect to cats and certain other animals, most commercially available litter materials are typically comprised of fine-size particles. These fine-size particles are typically comprised of clay; however other materials such as cellulosic materials (e.g., pine mulch, wheat products, etc.) have recently been proposed as alternatives to clay materials These litter materials are generally placed in the litter box to a desired depth. A protective material, generally referred to as a liner, is typically placed either at the bottom of the litter box or, alternatively, around the entire litter box, prior to the introduction of the litter material. In this manner, the contents of the litter box may be discarded by simply removing the liner from the litter box, without having to handle the contents themselves.

One problem associated with the use of litter materials is that these fine-size particles tend to become lodged within various areas of the animal's paws, such as between the digits; on the pads of the paw; or on, or in, the fur surrounding the paw. Thus, when the animal exits the litter box and begins walking away from the litter box, these fine-size particles are typically dislodged from the animal's paw whereupon they fall onto the floor area outside of the litter box. The vast majority of these dislodged particles are unsoiled, and could theoretically be safely and hygienically recycled back into the litter box.

Having dislodged litter materials on the floor area outside of the litter box creates an unpleasant, wasteful, and potentially unhealthy situation. These litter materials are typically rather gritty and can potentially irritate the soles of unclad feet or, alternatively, create a slick surface for the soles of certain shoes. Furthermore, these dislodged litter particles are difficult to completely clean up due to their relatively small size. Additionally, discarded litter materials, especially those which are not biodegradable (e.g., clay litters), are a major source of pollution. Finally, these litter materials, especially clay litters, typically contain quartz silica dust, which is dangerous to inhale or ingest.

Therefore, there exists a need for a method and apparatus for collecting and recycling litter materials lodged in the paws of cats and other animals in a safe, hygienic, economical, and reliable manner.

It is accordingly an object of the present invention to provide a new and improved method for collecting litter materials lodged in the paws of animals, such as, but not limited to, cats.

It is another object of the present invention to provide a new and improved method for recycling litter materials lodged in the paws of animals, such as, but not limited to, cats.

It is another object of the present invention to provide a new and improved apparatus for collecting litter materials lodged in the paws of animals, such as, but not limited to, cats.

It is another object of the present invention to provide a new and improved apparatus for recycling litter materials lodged in the paws of animals, such as, but not limited to, cats.

In order to overcome the aforementioned disadvantages and achieve the aforementioned objects, the present invention provides a method and apparatus for collecting and recycling litter materials lodged in the paws of animals, such as, but not limited to, cats, in accordance with the following embodiments.

SUMMARY OF THE INVENTION

In accordance with one embodiment of the present invention, an apparatus for collecting and recycling litter material lodged in the paw of an animal that has stepped in litter material contained in a litter box, comprises:
  a base, the base having a top surface and a bottom surface, the base having a substantially C-shaped upwardly depending wall member extending along a peripheral edge of the base; and
  a plurality of elongated raised members, the plurality of elongated raised members being disposed on at least a portion of the top surface of the base, each elongated raised member being positioned substantially parallel to an adjacent elongated raised member.

In accordance with another embodiment of the present invention, a method for collecting and recycling litter material lodged in the paw of an animal that has stepped in litter material contained in a litter box, comprises the steps of:
  a) providing an apparatus comprising:
      a base, the base having a top surface and a bottom surface, the base having a substantially C-shaped upwardly depending wall member extending along a peripheral edge of the base; and
      a plurality of elongated raised members, the plurality of elongated raised members being disposed on at least a portion of the top surface of the base, each elongated raised member being positioned substantially parallel to an adjacent elongated raised member;
  b) placing the apparatus adjacent to the litter box;
  c) allowing the animal to step onto the apparatus such that the animal's paw contacts at least a portion of the plurality of elongated raised members, wherein the litter material is dislodged from the animal's paw;
  d) collecting the dislodged litter material; and
  e) optionally recycling the dislodged litter material to the litter box.

A more complete appreciation of the present invention and its scope can be obtained from understanding the accompanying drawings, which are briefly summarized below, the following detailed description of the invention, and the appended claims.

BRIEF DESCRIPTION OF THE DRAWINGS

The same reference numerals refer to the same parts throughout the various FIGS.

DETAILED DESCRIPTION OF THE INVENTION

Figure 1:
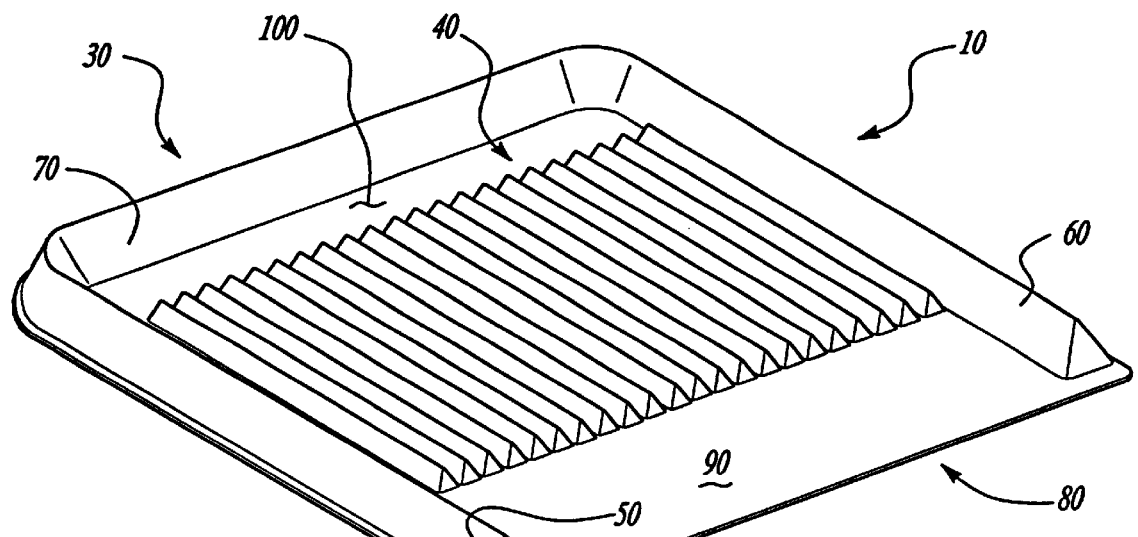
FIG. 1 is a perspective view of an apparatus in accordance with the preferred embodiment of the present invention.
Figure 2:
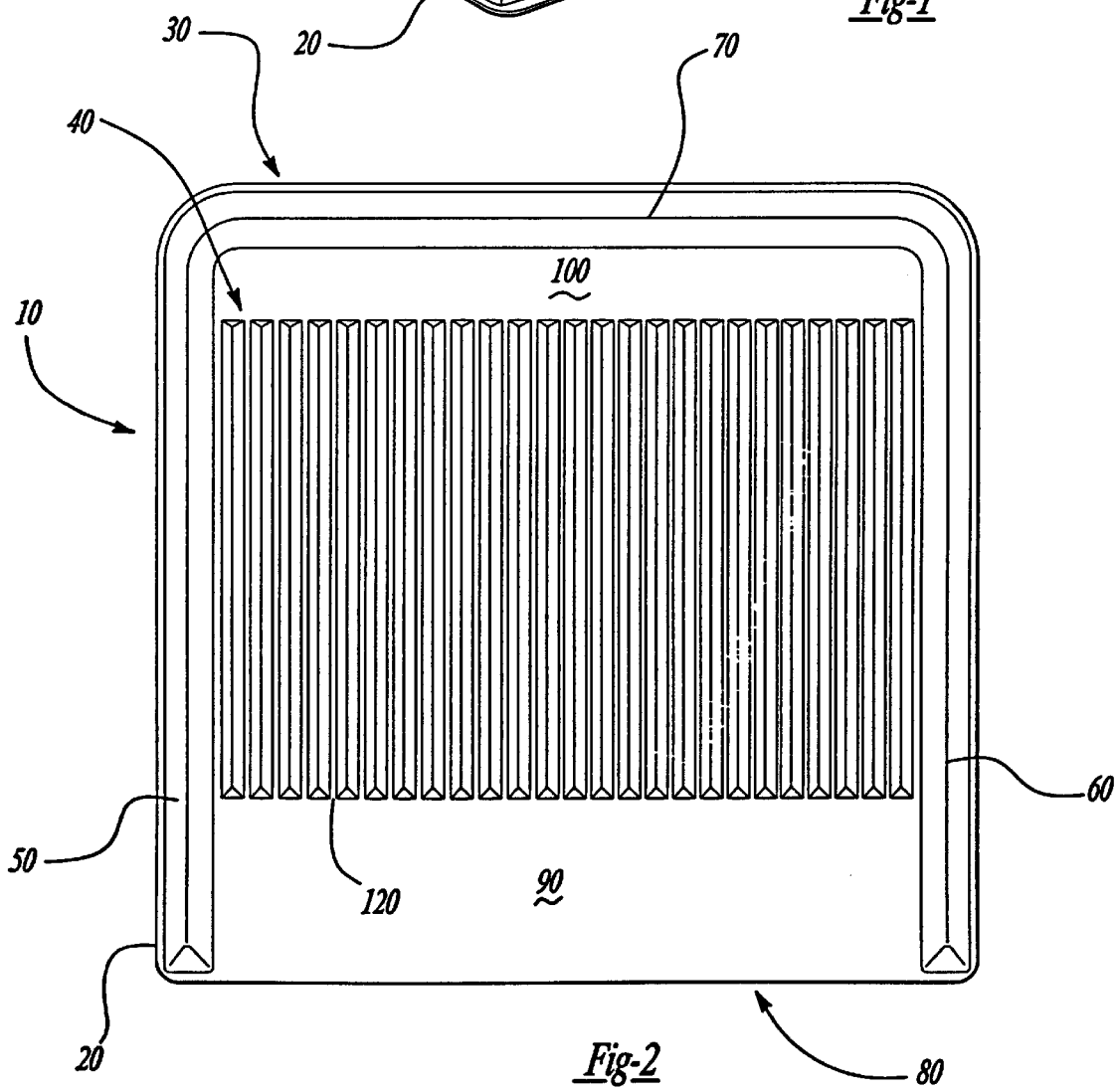
FIG. 2 is a top view of an apparatus in accordance with the preferred embodiment of the present invention.
Figure 3:
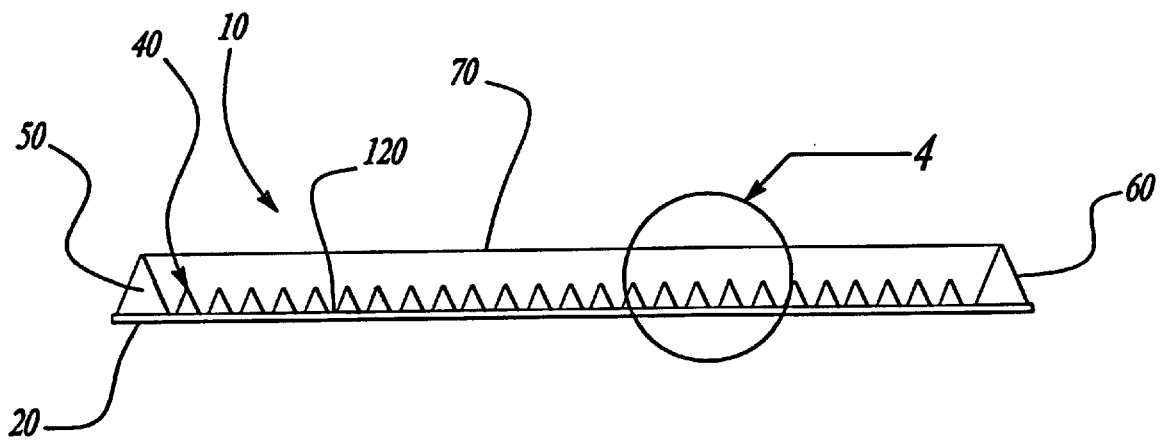
FIG. 3 is a rear elevational view of an apparatus in accordance with the preferred embodiment of the present invention.
Figure 4:
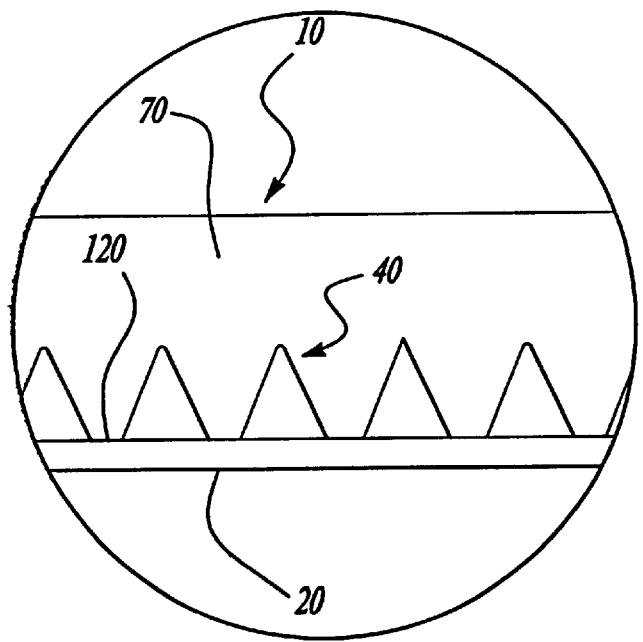
FIG. 4 is a partial enlarged rear elevational view of a portion of an apparatus in accordance with the preferred embodiment of the present invention.

Referring to FIGS. 1–4, there is generally shown an apparatus 10 in accordance with the preferred embodiment of the present invention. The apparatus 10 primarily includes a base 20, a substantially C-shaped wall member 30, and a plurality of ribs or elongated raised members 40 that are disposed on the top surface of the base 20.

The apparatus 10 is preferably comprised of any number of suitable materials, such as, but not limited to, thermoplastics, metals, woods, and fiberglass. Regardless of the particular material chosen, it should preferably be impervious to acids (e.g., from animal urine) and oils (e.g., secretions from animal glands).

Preferably, thermoplastic materials are employed to construct the apparatus 10 due to their relative ease of molding, low cost, light weight, low maintenance requirements, and durability. Preferably, thermoplastic materials such as, but not limited to, high density polyethylenes are used to construct the apparatus 10. High density polyethylenes are characterized by their opacity, chemical inertness, toughness at both low and high temperatures, chemical resistance, and moisture barrier and electrical-insulating properties.

If a thermoplastic is chosen as the construction material, the apparatus 10 can conveniently be made by the process of injection molding, or other suitable molding techniques. Injection molding is generally defined as a method of forming a plastic to the desired shape by forcing heat-softened plastic into a relatively cool cavity under pressure. By utilizing injection molding, the entire apparatus 10 can conveniently be formed in essentially one step, as opposed to having to assemble individual components to one another.

The base 20 preferably comprises a substantially planar member. The precise thickness, length, and width of the base 20 is not critical; however, it is preferable that the base 20 has a substantially rectangular or square configuration. In accordance with a preferred embodiment of the present invention, the base 20 has a length in the range of about 22 to about 23 inches and a width in the range of about 23 inches to about 24 inches. In accordance with a highly preferred embodiment of the present invention, the base 20 has a length of about 22 inches and a width of about 23.6 inches. If the base 20 is comprised of a thermoplastic material, it should preferably have a thickness in the range of about 0.04 to about 0.06 inches.

The substantially C-shaped wall member 30 preferably extends along a peripheral edge of the base 20. The wall member 30 comprises a pair of opposed and spaced sidewall portions 50 and 60; and an endwall portion 70. It should be noted that there is an open portion 80 of the base 20 having no wall portion associated therewith. The wall member 30 may be shaped into any number of suitable configurations. For example, although the wall member 30 is shown as being angled in a substantially inverted V-shape, it may also configured so as to be perpendicular to the base 20; angled away from the base 20; or angled toward the base 20. The precise thickness, angle, height, and width of the wall member 30 is not critical: however, it is preferable that the wall member 30 has a sufficient height and angle to retain any dislodged litter materials in the apparatus 10 itself.

Additionally, the height of the wall member 30 should be substantially the same along the entire length of the wall member 30. In accordance with a preferred embodiment of the present invention, the wall member 30 has a height in the range of about 1.5 to about 2.0 inches along the entire length of the wall member 30. In accordance with a highly preferred embodiment of the present invention, the wall member 30 has a height of about 1.8 inches along the entire length of the wall member 30. If the wall member 30 is comprised of a thermoplastic material, it should preferably have a thickness in the range of about 0.04 to about 0.06 inches.

A plurality of ribs or elongated raised members 40 are disposed on at least a portion of the top surface of the base 20. The elongated raised members 40 are shown as being inverted V-shaped members; however, any number of suitable configurations may be used. Preferably, the elongated raised members 40 are shaped to avoid harming or injuring the paws of the animal (e.g., rounded as opposed to sharp edges). If the apparatus 10 is comprised of a thermoplastic material, the elongated raised members 40 may be conveniently formed on the top surface of the base 20 during the molding process. If other non-thermoplastic materials are used, or if the elongated raised members 40 are manufactured separately, the elongated raised members 40 may be fastened to the top surface of the base 20 by such means as glue, tape, metallurgical attachment, nails, screws, bolts, rivets, VELCRO™, or any other suitable means. If the elongated raised members 40 are comprised of a thermoplastic material, they should preferably have a thickness in the range of about 0.04 to about 0.06 inches.

It should be noted that the elongated raised members 40 do not extend onto the open portion 80 of the base 20, thus defining a first planar area 90. It should also be noted that the elongated raised members 40 do not extend onto the portion of the base 20 in close proximity to the endwall portion 70 of the wall member 30, thus defining a second planar area 100.

The exact length of the elongated raised members 40 is not critical, provided they do not extend either into the first planar area 90 or the second planar area 100. In accordance with a preferred embodiment of the present invention, the length of the elongated raised members 40 is in the range of about 14 to about 15 inches. In accordance with a highly preferred embodiment of the present invention, the length of the elongated raised members 40 is about 14.2 inches. In order to define the first planar area 90, the elongated raised members 40 should preferably terminate at a distance of about 4 to about 5 inches from the peripheral edge of the open portion 80 of the base 20. In order to define the second planar area 100, the elongated raised members 40 should preferably terminate at a distance of about 1 inch from the endwall portion 70 of the wall member 30.

It should be noted that each elongated raised member 40 is positioned so as to be substantially parallel to the adjacent elongated raised member 40. The exact number of elongated raised members 40 is not critical, provided that there are a sufficient number so as to effectively cause the dislodging of litter material lodged in the paw of an animal. In accordance with a preferred embodiment of the present invention, 25 elongated raised members 40 are provided on the top surface of the base 20.

The exact height of the elongated raised members 40 is not critical, provided that they are of a sufficient height so as to effectively cause the dislodging of litter material lodged in the paw of an animal. In accordance with a preferred embodiment of the present invention, the height of the elongated raised members 40 is in the range of about 0.5 to about 1.0 inches. In accordance with a highly preferred embodiment of the present invention, the height of the elongated raised members 40 is about 0.7 inches.

Furthermore, the height of the elongated raised members 40 should not be so high as to cause pain or injury to the animal's paw when the area at the apex between two adjacent digits contacts and presses against an elongated raised member 40. However, the height of the elongated raised members 40 should be sufficiently high enough so that the litter particles do not reattach themselves to the animal's paw. Additionally, the height of the elongated raised members 40 should not be so low as to fail to cause the individual digits of the animal's paw to flex or splay so as to facilitate the dislodging of lodged litter materials. Of course, these "low" and "high" height considerations will depend, in part, on the particular size of the paw of the animal using the apparatus 10.

Without being bound to a particular theory of the operation of the present invention, it is believed that the dislodging of litter materials lodged in the paw of an animal is facilitated by the individual digits of the animal's paw being flexed or splayed apart by the plurality of elongated raised members 40. Without being bound to a particular theory of the operation of the present invention, it is believed that this flexing or splaying of the animal's paw accomplishes two results: (1) litter material held loosely between the digits of the paw, or in or on the fur surrounding the digits of the paw, falls freely out; and (2) litter material held more strongly between the digits of the paw, or in or on the fur surrounding the digits of the paw, abrades against the various surfaces of the elongated raised members 40, and then falls freely out.

Without being bound to a particular theory of the operation of the present invention, it is believed that the spacing between the elongated raised members 40 also plays a role in facilitating the dislodging of litter materials lodged in the paw of an animal. Accordingly, the elongated raised members 40 should preferably be spaced far enough apart so that an animal is forced to spread the digits of each paw in order to provide proper balancing when stepping onto the elongated raised members 40 of the apparatus 10. This action causes the litter particles to be dislodged from the animal's paws and fall into the area 120 between the elongated raised members 40 of the apparatus 10. In accordance with a preferred embodiment of the present invention, the apex of each elongated raised member 40 should be spaced about 0.75 to about 0.85 inches apart from the apex of the adjacent elongated raised member 40. In accordance with a highly preferred embodiment of the present invention, the apex of each elongated raised member 40 should be spaced about 0.8 inches apart from the apex of the adjacent elongated raised member 40.

Figure 5:
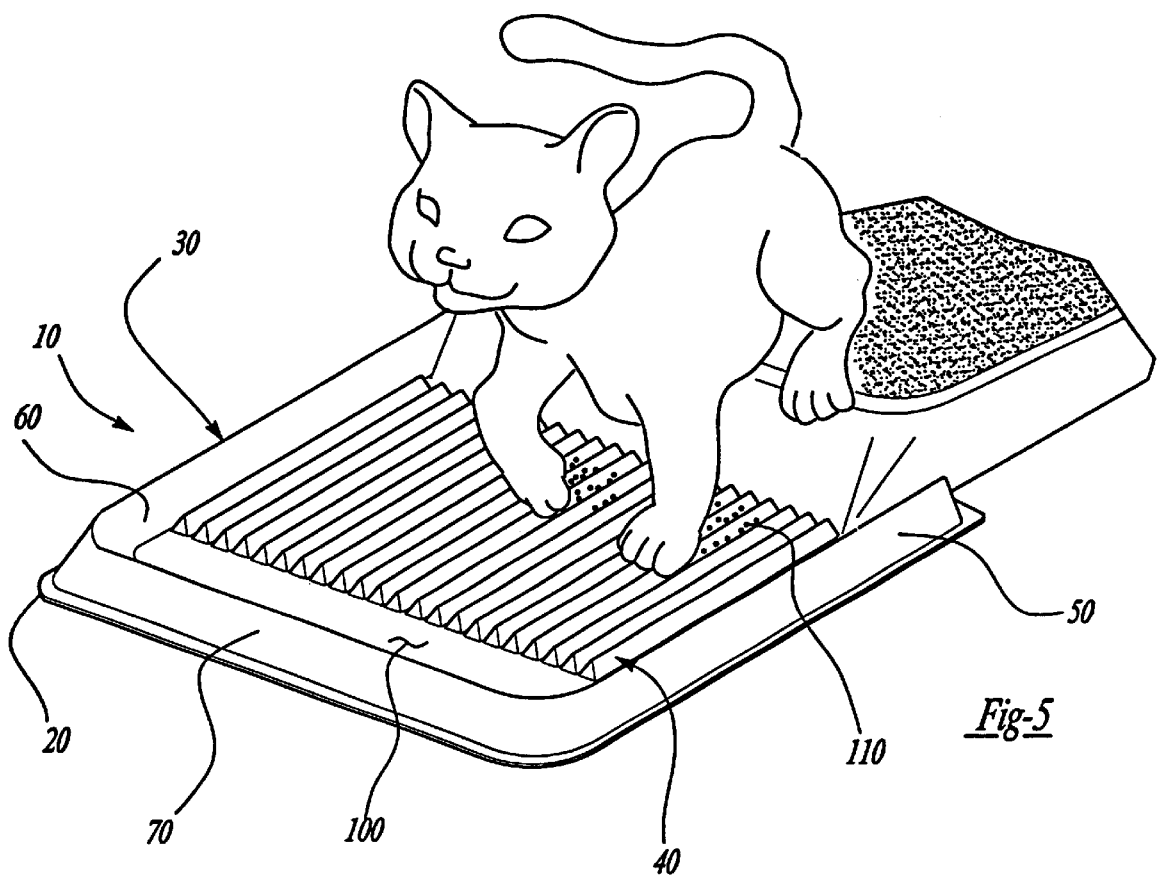
FIG. 5 is a perspective view illustrating an intended use of an apparatus in accordance with the preferred embodiment of the present invention.

The intended operation of the apparatus 10 will be described in detail with reference to FIG. 5. In operation, the apparatus 10 is preferably used in conjunction with a litter box or other suitable receptacle. Of course, the apparatus 10 of the present invention can be formed into configurations of various shapes and dimensions in order to physically cooperate with any litter box. Preferably, the litter box is positioned so as to rest at least a portion of the bottom surface of the litter box on top of the first planar area 90 (not shown) and abut against the end surfaces of the elongated raised members 40. The inner surfaces of the sidewall portions 50 and 60 also preferably abut against one or more side surfaces of the litter box so as to provide enough resistive force (e.g., friction) to prevent the apparatus 10 from becoming easily separated from the litter box. If this particular position is not achievable due to geometric incompatibilities, then the apparatus 10 should be placed next to the side of the litter box that the animal is most likely to exit from. Additionally, a canopy may be placed over the litter box in order to force the animal to exit the litter box from the desired direction.

As the animal exits the litter box, it will step onto one or more of the elongated raised members 40, thus causing a plurality of dislodged litter particles 110 to fall into the area 120 (not shown) between the elongated raised members 40, as previously described. The animal will then eventually step completely off the apparatus 10 and onto the floor. At that point, a person will then be able to remove the apparatus 10 from the litter box by pulling the apparatus 10 away from the litter box in a generally horizontal direction, thus freeing the first planar area 90 (not shown) from underneath the litter box. The apparatus 10 is then preferably tilted or maneuvered in such a manner so as to cause the dislodged litter particles 110 to conveniently collect in the second planar area 100. At this point, the collected dislodged litter particles 110 may be recycled by returning (e.g., pouring) them into the litter box; or they may be discarded in the trash.

The foregoing description is considered illustrative only of the principles of the invention. Furthermore, because numerous modifications and changes will readily occur to those skilled in the art, it is not desired to limit the invention to the exact construction and process shown as described above. Accordingly, all suitable modifications and equivalents that may be resorted to that fall within the scope of the invention as defined by the claims that follow.

What is claimed is:

1. A stepping pad for collecting and recycling litter material lodged in the paw of an animal that has stepped in litter material contained in a litter box, comprising:

a base, the base having a top surface and a bottom surface, the base having a substantially C-shaped upwardly depending wall member extending along a peripheral edge of the base; and a plurality of elongated raised members, the plurality of elongated raised members being disposed on at least a portion of the top surface of the base, each elongated raised member being positioned substantially parallel to an adjacent elongated raised member;

wherein at least a portion of the base is adapted for abutting engagement with at least a portion of an external surface of the litter box.

2. The apparatus according to claim 1, wherein the elongated raised members are disposed on a central portion of the top surface of the base.

3. The apparatus according to claim 1, wherein the top surface of the base comprises a first and second planar area, the first planar area being spaced and opposed from the second planar area.

4. The apparatus according to claim 3, wherein the first planar area is removably engaged to at least a portion of the litter box.

5. The apparatus according to claim 1, wherein the wall member has a height greater than the height of the elongated raised members.

6. The apparatus according to claim 1, wherein the elongated raised members have a height sufficient to facilitate dislodging litter material from the paw of an animal when the animal steps onto the elongated raised members.

7. The apparatus according to claim 6, wherein the wall member has a height sufficient to retain any dislodged litter material.

8. The apparatus according to claim 1, wherein the elongated raised members are spaced from an adjacent elongated raised member a distance sufficient to facilitate dislodging litter material from the paw of an animal when the animal steps onto the elongated raised members.

9. The apparatus according to claim 8, wherein the wall member has a height sufficient to retain any dislodged litter material.

10. A method for collecting and recycling litter material lodged in the paw of an animal that has stepped in litter material contained in a litter box, comprising the steps of:

a) providing a stepping pad apparatus comprising:

a base, the base having a top surface and a bottom surface, the base having a substantially C-shaped upwardly depending wall member extending along a peripheral edge of the base; and a plurality of elongated raised members, the plurality of elongated raised members being disposed on at least a portion of the top surface of the base, each elongated raised member being positioned substantially parallel to the pair of sidewall members;

b) placing the apparatus adjacent to the litter box;

c) allowing the animal to step onto the apparatus such that the animal's paw contacts at least a portion of the plurality of elongated raised members, wherein the litter material is dislodged from the animal's paw;

d) collecting the dislodged litter material; and e) optionally recycling the dislodged litter material to the litter box.

* * * * *